United States Patent
Alexander

(10) Patent No.: US 9,988,155 B2
(45) Date of Patent: Jun. 5, 2018

(54) SYSTEM AND METHOD FOR AFT MOUNT OF GAS TURBINE ENGINE

(71) Applicant: UNITED TECHNOLOGIES CORPORATION, Farmington, CT (US)

(72) Inventor: Eric J. Alexander, San Diego, CA (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days. days.

(21) Appl. No.: 14/766,664

(22) PCT Filed: Feb. 6, 2014

(86) PCT No.: PCT/US2014/015124
§ 371 (c)(1),
(2) Date: Aug. 7, 2015

(87) PCT Pub. No.: WO2014/172000
PCT Pub. Date: Oct. 23, 2014

(65) Prior Publication Data
US 2015/0367948 A1    Dec. 24, 2015

Related U.S. Application Data

(60) Provisional application No. 61/761,771, filed on Feb. 7, 2013.

(51) Int. Cl.
*B64D 27/00* (2006.01)
*B64D 27/26* (2006.01)
(Continued)

(52) U.S. Cl.
CPC ............. *B64D 27/26* (2013.01); *B64D 27/14* (2013.01); *B64D 33/04* (2013.01); *F02C 7/20* (2013.01);
(Continued)

(58) Field of Classification Search
CPC ........ B64D 27/26; B64D 27/14; B64D 33/04; B64D 2027/262; F02C 7/20; Y02T 50/44;
(Continued)

(56) References Cited

U.S. PATENT DOCUMENTS 3,591,963 A * 7/1971 Kopp ................... B64D 27/26
277/646
3,756,026 A * 9/1973 Timms ..................... F02K 1/06
239/265.43
(Continued)

FOREIGN PATENT DOCUMENTS

JP          201096702 A      9/2010

OTHER PUBLICATIONS

International Search Authority, International Search Report, dated Dec. 12, 2014 for PCT/US2014/015124.
(Continued)

*Primary Examiner* — Assres H Woldemaryam
(74) *Attorney, Agent, or Firm* — Cantor Colburn LLP

(57) ABSTRACT

The present disclosure is applicable to all vehicles having an engine mounted therein. In one embodiment, an aft mount system for a gas turbine engine is disclosed. The aft mount system includes a vehicle chassis and at least one flexible mounting member disposed within the vehicle chassis, wherein when a gas turbine engine is received within the vehicle chassis, an exhaust portion of the gas turbine engine is substantially mounted within the vehicle chassis through engagement with the at least one flexible mounting member.

18 Claims, 6 Drawing Sheets

(51) Int. Cl.
*F02C 7/20* (2006.01)
*B64D 27/14* (2006.01)
*B64D 33/04* (2006.01)

(52) U.S. Cl.
CPC .. *B64D 2027/262* (2013.01); *F05D 2250/232* (2013.01); *F05D 2260/96* (2013.01); *Y02T 50/44* (2013.01); *Y10T 29/49623* (2015.01); *Y10T 156/10* (2015.01)

(58) Field of Classification Search
CPC ............. Y10T 156/10; Y10T 29/49623; F05D 2260/96; F05D 2250/232
See application file for complete search history.

(56) References Cited

U.S. PATENT DOCUMENTS

| | | | |
|---|---|---|---|
| 4,022,018 A | 5/1977 | Tuten et al. | |
| 5,226,288 A * | 7/1993 | Cornax | F02C 7/20 60/226.1 |
| 5,351,930 A * | 10/1994 | Gwinn | B64D 27/26 244/54 |
| 7,270,539 B1 * | 9/2007 | Sujata | F23G 7/008 110/238 |
| 8,052,083 B1 * | 11/2011 | Moran | B64D 33/02 244/53 B |
| 8,979,491 B2 * | 3/2015 | Heyerman | B64D 27/20 248/554 |
| 9,212,625 B2 * | 12/2015 | Shelley | F02K 5/00 |
| 9,338,830 B2 * | 5/2016 | Broughton | H05B 3/28 |
| 2003/0126856 A1 * | 7/2003 | Lair | F02K 1/06 60/262 |
| 2003/0145600 A1 * | 8/2003 | Senile | F02K 1/12 60/771 |
| 2004/0055311 A1 | 3/2004 | Swinford et al. | |
| 2005/0081531 A1 * | 4/2005 | Stretton | B64D 27/16 60/797 |
| 2006/0011780 A1 * | 1/2006 | Brand | B64D 35/04 244/60 |
| 2008/0265124 A1 * | 10/2008 | Lindberg | B25H 1/0007 248/670 |
| 2009/0212504 A1 * | 8/2009 | Chila | F01D 9/023 277/628 |
| 2012/0018575 A1 * | 1/2012 | Whiteford | B64D 27/20 244/54 |
| 2012/0291452 A1 * | 11/2012 | Moehrle | F23R 3/10 60/796 |
| 2013/0161094 A1 * | 6/2013 | Broughton | F02C 7/12 174/88 R |
| 2013/0186105 A1 * | 7/2013 | Meacham | F01D 25/28 60/797 |

OTHER PUBLICATIONS

International Search Authority, Written Opinion of the International Search Authority, dated Dec. 12, 2014 for PCT/US2014/015124.

* cited by examiner

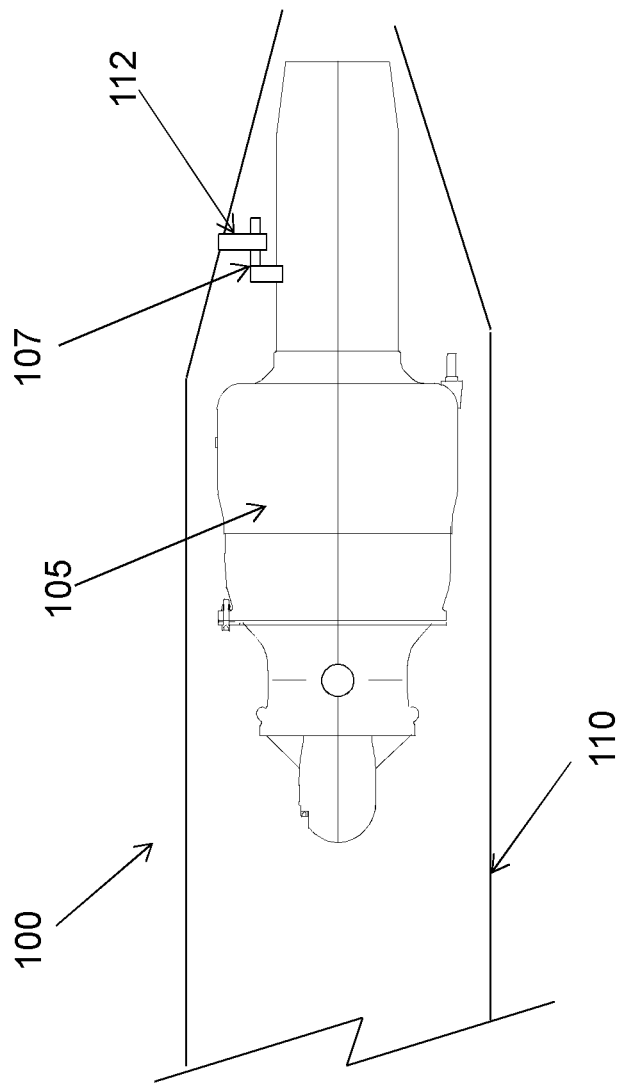

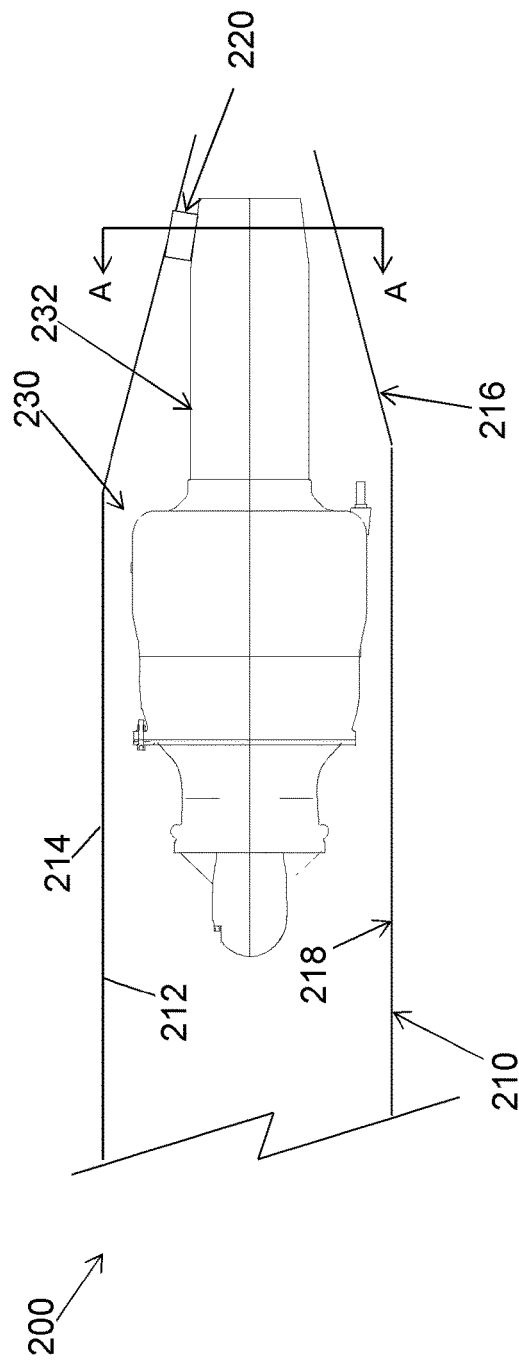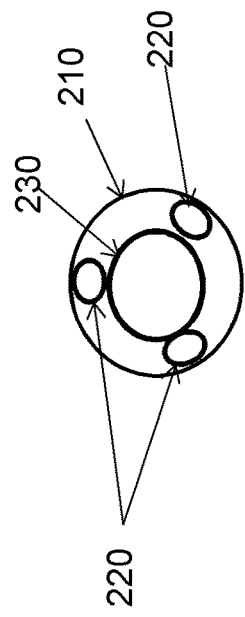

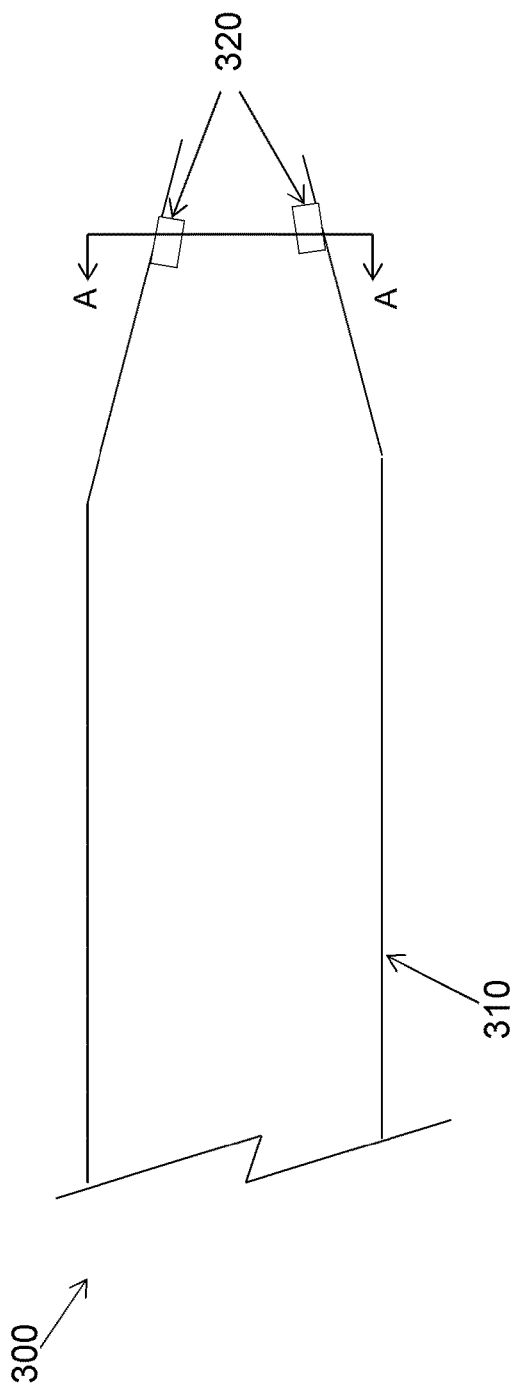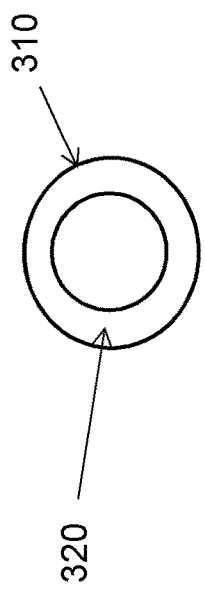

SYSTEM AND METHOD FOR AFT MOUNT OF GAS TURBINE ENGINE

CROSS-REFERENCE TO RELATED APPLICATIONS

The present application is a national stage of and claims the priority benefit of PCT Application Serial No. PCT/US2014/015124, filed Feb. 6, 2014, which claims the priority benefit of U.S. Patent Application Ser. No. 61/761,771 filed Feb. 7, 2013, the text and drawings of which are hereby incorporated by reference in their entireties.

TECHNICAL FIELD OF THE DISCLOSURE

The present disclosure is generally related to engine mount assemblies and, more specifically, to the installation of gas turbine engines in a vehicle.

BACKGROUND OF THE DISCLOSURE

Typically, the installation assembly for gas turbine engines into vehicles or missiles has included one or more forward mounts or isolators to secure the fore end of the engine and a metal sliding mount assembly to secure the aft end of the engine. For example, FIG. 1 shows a vehicle assembly 100 having a gas turbine engine 105 installed inside of a vehicle 110. In FIG. 1, an aft mount portion 107, which is attached to the gas turbine engine 105, is slidably received within the aft mount receptacle 112, which is attached to the interior of the vehicle 110, to secure the aft end of the gas turbine engine 105 to the vehicle 110. Unfortunately, the aft mount assembly in FIG. 1 is difficult to implement because of space limitations in vehicles. In addition, the aft mount portion 107 and aft mount receptacle 112 must be made of high grade steel, which is expensive to manufacture, in order to withstand the stress and extreme temperatures of vehicle and engine operation. As a result, there exists a need for an aft mount assembly that can secure a gas turbine engine to a vehicle without significantly limiting the interior vehicle space and at a lower cost as compared to existing aft mount assemblies.

SUMMARY OF THE DISCLOSURE

In one embodiment, an aft mount system for a gas turbine engine is disclosed. The aft mount system includes a vehicle chassis and at least one flexible mounting member disposed within the vehicle chassis, wherein when a gas turbine engine is received within the vehicle chassis, an exhaust portion of the gas turbine engine is substantially mounted within the vehicle chassis through engagement with the at least one flexible mounting member.

In another embodiment, a method for preparing a vehicle is disclosed. The method includes attaching at least one flexible mounting member to at least a portion of an inner wall of a vehicle chassis such that when a gas turbine engine is received in the vehicle chassis, an exhaust portion of the gas turbine engine is substantially mounted within the vehicle chassis through engagement with the at least one flexible mounting member.

In another embodiment, a vehicle system is disclosed. The vehicle system includes at least one flexible mounting member disposed within a vehicle chassis and a gas turbine engine comprising an exhaust portion, the exhaust portion substantially mounted within the vehicle chassis through engagement with the at least one flexible mounting member. Other embodiments are also disclosed.

BRIEF DESCRIPTION OF THE DRAWINGS

The features and advantages of this disclosure, and the manner of attaining them, will be more apparent and better understood by reference to the accompanying drawings, wherein:

FIG. 1 is a partial cross-section of a prior art aft mount system.

FIG. 2a is a partial cross-section of an aft mount system having an engine mounted therein according to an embodiment.

FIG. 2b shows a cross-section of the aft mount system and engine in FIG. 2a along Section A-A in an embodiment.

FIG. 3a is a partial cross-section of an aft mount system according to an embodiment.

FIG. 3b shows a cross-section of the aft mount system in FIG. 2c along Section A-A in an embodiment.

DETAILED DESCRIPTION OF THE DISCLOSED EMBODIMENTS

Figure 4:
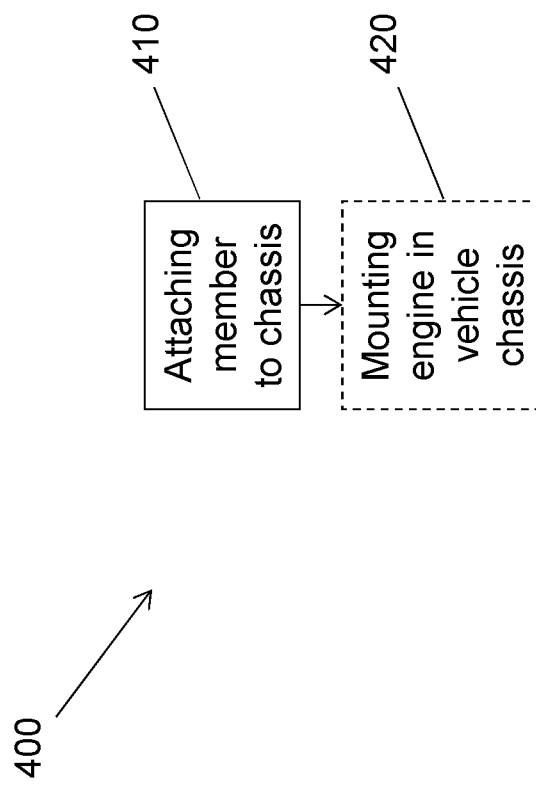
FIG. 4 illustrates a method for installing an engine in a vehicle according to an embodiment.

For the purposes of promoting an understanding of the principles of the present disclosure, reference will now be made to certain embodiments and specific language will be used to describe the same. It will nevertheless be understood that no limitation of the scope of the disclosure is thereby intended, and alterations and modifications, and further applications of the principles of the disclosure as illustrated therein are herein contemplated as would normally occur to one skilled in the art to which the disclosure relates.

The present disclosure describes a mount system for the aft portion of an engine and a method for mounting the aft portion of an engine within a vehicle and a vehicle system. The aft mount system of the present disclosure allows for the aft portion of an engine to be mounted within a vehicle and a vehicle system using at least one flexible mounting member. The use of at least one flexible mounting member for mounting the aft portion of an engine reduces cost, weight, and spatial footprint as compared to previous mounting mechanisms. Such improvements in design metrics for vehicles provides for, among other things, greater range and performance for vehicles.

FIG. 2a shows a partial cross-section of an aft mount system 200 with the aft portion 232 of an engine 230 mounted within the system 200 according to an embodiment. In FIG. 2a, the aft mount system 200 includes a hollow vehicle chassis 210 and flexible mounting members 220 attached to the vehicle chassis 210. As shown in FIG. 2a, the vehicle chassis 210 includes opposing inner and outer walls 212, 214, a first portion 216, and a second portion 218. In FIG. 2a, the first portion 216 of the vehicle chassis 210 has a substantially conical frustum shape, while the second portion 218 of the vehicle chassis 218 is substantially cylindrical in shape. In other embodiments, the vehicle chassis 210 may be only cylindrical in shape, only conical frustum in shape, or another shape or combination of shapes. The vehicle chassis 210 may be formed of various materials including, but not limited to, metals, composites, and the like. It should be noted that the engine referred to herein may be various types of engines, including, but not limited to, gas turbine engines, miniature gas turbine engines, auxiliary power units, and the like.

As shown in FIG. 2a, a flexible mounting member 220 is attached to the inner wall 212 of the first portion 216 of the vehicle chassis 210. Based upon the configuration and number of flexible mounting members 220 attached to the inner wall 212 of the vehicle chassis 210, the aft mount system 200 of the present disclosure is configured to secure the aft portion 232 of the engine 230 within the vehicle chassis 210 in various orientations. That is, when the engine 230 is received within the vehicle chassis 210 (as shown in FIG. 2a), the aft portion 232 of the engine 230 engages the flexible mounting members 220 causing the aft portion 232 of the engine 230 to be secured within the vehicle chassis 210. The use of flexible mounting members 220 as a mounting system provides for an easier installation of engines into vehicles and for natural dampening of engine-to-vehicle and vehicle-to-engine vibrations. In addition, the flexible mounting members 220 provide flexibility, which accommodates for thermal growth of the engine.

FIG. 2b shows a cross-section of the aft mount system 200 and engine 230 in FIG. 2a along Section A-A, which cuts through the vehicle chassis 210, flexible mounting members 220, and engine 230. In FIG. 2b, the aft portion 232 of the engine 230 is shown mounted through its engagement with the three flexible mounting members 220 that are evenly distributed axially about the first portion 216. The configuration of the flexible mounting members 220 in FIG. 2b causes the aft portion 232 of the engine 230 to be substantially centered axially within the vehicle chassis 210. One of ordinary skill in the art would understand that with different configurations of flexible mounting members 220 and sizes, the aft portion of an engine may have the same orientation as that provided in FIG. 2b (i.e., axially centered within the vehicle chassis 210) or a different orientation relative to the vehicle chassis 210 (e.g., a slight off-center orientation). As shown in FIGS. 3a and 3b, according to at least one embodiment of the present disclosure, the flexible mounting members 320 of an aft mount system 300 may include a single segment that forms a circle inside of the vehicle chassis 310. The flexible mounting members 320 are configured to substantially center an aft portion of an engine relative to the vehicle chassis 310. Alternatively, the flexible mounting members 320 may be a single segment that forms a spiral inside of the vehicle chassis 310. In another example, the flexible mounting members 220, 320 may include two segments, four segments, or more segments, which can be attached to the vehicle chassis 210, 310 in various configurations for securing aft portions 232 of engines 230.

The flexible mounting members 220, 320 may be attached to the vehicle chassis 210, 310 in various ways. For example, the flexible mounting members 220, 320 may be attached to the vehicle chassis 210, 310 using a high temperature bond agent or other adhesives, various fasteners, and the like. As shown in FIG. 2a, the flexible mounting members 220 may extend along only a portion of the inner wall 212 and about the circumference of the first portion 216. Alternatively, in other embodiments, the flexible mounting members 220 may extend various other lengths along the inner wall 212 in the longitudinal direction and about the circumference of the first portion 216.

While the flexible mounting members 220, 320 are described herein as being attached to the vehicle chassis 210, 310 via the inner wall 212, the flexible mounting members 220, 320 may also be secured within the vehicle chassis 210, 310 in other ways, such as being attached to the vehicle chassis 210, 310 indirectly. For example, an intermediate apparatus may be disposed within the vehicle chassis 210, 310, which is attached to the vehicle chassis 210, 310 or otherwise substantially secured in the vehicle chassis 210, 310, and the flexible mounting members 220, 320 may be attached to the intermediate apparatus. Such an arrangement may be used if the selected engine 230 has a significantly smaller diameter compared to the diameter of the vehicle chassis 210, 310. Additionally or alternatively, an intermediate apparatus may be used to further dampen vibrations between the engine 230 and vehicle chassis 210, 310. As opposed to being attached to the vehicle chassis 210, 310, the flexible mounting members 220, 320 may be secured to an engine 230 or disposed within the vehicle chassis 210, 310 without being attached to the vehicle chassis 210, 310 (e.g., through press fit and the like). If the flexible mounting members 220, 320 are secured to an engine 230, the engine 230 (with flexible mounting members 220, 320) may be inserted into a vehicle chassis 210, 310 and mounted therein through the flexible mounting members 220, 320 engaging the inner wall 212 of the vehicle chassis 210, 310. Additionally or alternatively, the flexible mounting members 220, 320 may be disposed between the engine 230 and vehicle chassis 210, 310 without being attached to either structure, such as by being in the space therebetween by friction fit.

The flexible mounting members 220, 320 may include various flexible items for mounting the aft end of an engine such as, for example, elongated material, high temperature elongated material, rope, high temperature rope, and the like. As used herein, high temperature (e.g., high temperature rope) refers to any design temperature desired for the flexible mounting material to operate in, where the design temperature is chosen for the particular application in which the flexible mounting material will be used. For example, a flexible mounting member 220, 320 may include InSilMax™ Extreme High Temperature Rope in an embodiment. The flexible mounting members 220, 320 may take various forms including, but not limited to, knitted rope, twisted rope, and square braided rope. The flexible mounting members 220, 320 may have various cross-sectional shapes (e.g., circular, oval, square, and the like), widths, lengths, and other dimensions and properties depending upon the application (e.g., type of engine). The flexible mounting members 220, 320 may be formed of extruded sections and the like. Typically, the flexible mounting members 220, 320 can also be stored for long periods of time and are cheaper than existing mechanical mount systems.

FIG. 4 depicts a method for preparing a vehicle 400 according to an embodiment. As shown in FIG. 4, the method 400 includes at block 410 attaching at least one flexible mounting member to at least a portion of the inner wall of the vehicle chassis such that when a gas turbine engine is received in the vehicle chassis, an exhaust portion of the gas turbine engine is substantially mounted within the vehicle chassis through engagement with the at least one flexible mounting member. At block 410 attaching at least one flexible mounting member may include applying one or more high temperature resistant adhesives to one or both of the vehicle chassis and the at least one flexible mounting member. Alternatively or in addition, attaching the at least one flexible mounting member may include applying one or more fasteners. As shown in FIG. 4, the method 400 may also include at block 420 inserting a gas turbine engine into the vehicle chassis so that the exhaust portion of the gas turbine engine engages the at least one flexible mounting member causing the exhaust portion to be substantially mounted within the vehicle chassis.

Figure 5:
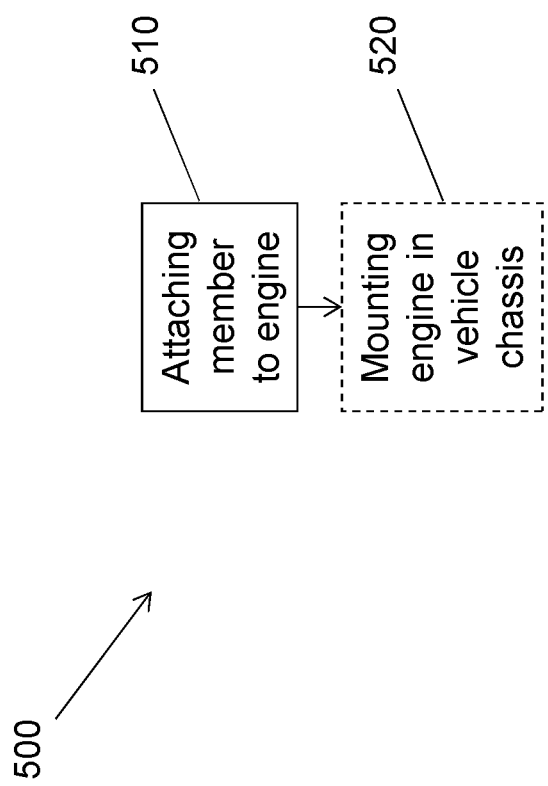
FIG. 5 illustrates a method for installing an engine in a vehicle according to an embodiment.

FIG. 5 depicts a method for preparing a vehicle 500 according to an embodiment. As shown in FIG. 5, the method 500 includes at block 510 attaching at least one flexible mounting member to at least a portion of an engine. At block 510 attaching at least one flexible mounting member may include applying one or more high temperature resistant adhesives to one or both of the engine and the at least one flexible mounting member. Alternatively or in addition, attaching the at least one flexible mounting member may include applying one or more fasteners. As shown in FIG. 5, the method 500 may also include at block 520 inserting the engine into a vehicle chassis so that the aft end of the engine is substantially mounted within the vehicle chassis at least partially because of the at least one flexible mounting member engaging the vehicle chassis.

Figure 6:
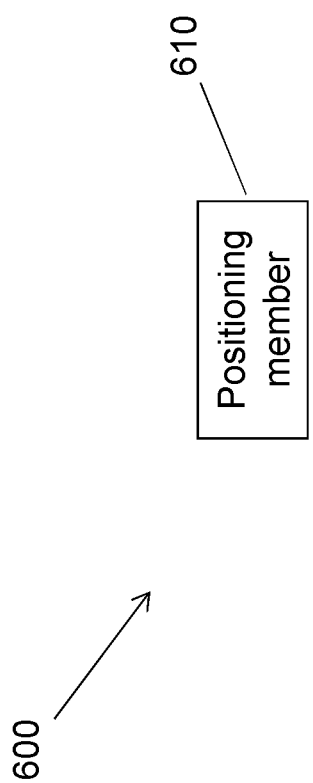
FIG. 6 illustrates a method for installing an engine in a vehicle according to an embodiment.

FIG. 6 depicts a method for preparing a vehicle 600 according to an embodiment. As shown in FIG. 6, the method 600 includes at block 610 positioning at least one flexible mounting member such that the at least one flexible mounting member is between a vehicle chassis and an engine when the engine is mounted within the vehicle chassis. In one embodiment, the at least one flexible mounting member may be inserted within a vehicle chassis so that when an engine is inserted into the vehicle chassis the aft end of the engine is substantially mounted within the vehicle chassis through engagement with the at least one flexible mounting member. In one embodiment, the at least one flexible mounting member may be at least partially wrapped around an engine and the vehicle chassis slid over the outside of the engine so that the aft end of the engine is substantially mounted within the vehicle chassis through engagement with the at least one flexible mounting member.

While the disclosure has been illustrated and described in detail in the drawings and foregoing description, the same is to be considered as illustrative and not restrictive in character, it being understood that only certain embodiments have been shown and described and that all changes and modifications that come within the spirit of the disclosure are desired to be protected.

What is claimed:

1. An aft mount system for a miniature gas turbine engine in a missile, the system comprising:
    a missile chassis; and
    at least one flexible mounting member disposed within the missile chassis, wherein the at least one flexible mounting member secures an aft exhaust portion of the miniature gas turbine engine within the missile chassis wherein the aft exhaust portion of the miniature gas turbine engine engages the at least one flexible mounting member when the miniature gas turbine engine is inserted into the missile chassis, and wherein the at least one flexible mounting member dampens vibrations between the miniature gas turbine engine and the missile chassis.

2. The system of claim 1, wherein the at least one flexible mounting member is secured to an aft converging portion of the missile chassis and the aft converging portion is conical-frustum-shaped.

3. The system of claim 1, wherein the at least one flexible mounting member is at least one of the following: rope, high temperature rope, at least partially square-braided rope, at least partially knitted rope, at least partially twisted rope, and extruded sections.

4. The system of claim 2, wherein the at least one flexible mounting member comprises three segments of rope, wherein each of the three segments of rope are attached at the same longitudinal position along the aft converging portion of the missile chassis.

5. The system of claim 4, wherein the three segments of rope are evenly distributed on the first end portion.

6. The system of claim 1, wherein the at least one flexible mounting member is a single, continuous segment of rope.

7. The system of claim 1, wherein at least one flexible mounting member is a single segment that forms a circle and when the miniature gas turbine engine is received in the missile chassis, the at least one flexible mounting member centers the aft exhaust portion axially within the missile chassis.

8. A method of securing a miniature gas turbine engine to missile chassis, the method comprising:
    attaching at least one flexible mounting member to at least a portion of an inner wall of the missile chassis such that the at least one flexible mounting member extends away from the inner wall; and
    inserting the miniature gas turbine engine into the missile chassis until an aft exhaust portion of the miniature gas turbine engine engages the at least one flexible mounting member, wherein the at least one flexible mounting member dampens vibrations between the miniature gas turbine engine and the missile chassis.

9. The method of claim 8, wherein the step of attaching the at least one flexible mounting member comprises applying one or more high temperature resistant adhesives to one or both of the missile chassis and the at least one flexible mounting member.

10. The method of claim 8, wherein the step of attaching the at least one flexible mounting member comprises applying one or more fasteners.

11. The method of claim 8, wherein the miniature gas turbine engine is inserted axially into the missile chassis until an aft exhaust portion of the miniature gas compresses the at least one flexible mounting member between an aft converging portion of the missile chassis and the aft exhaust portion of the miniature gas turbine engine.

12. The method of claim 8, wherein the at least one flexible mounting member is at least one of the following: rope, high temperature rope, at least partially square-braided rope, at least partially knitted rope, at least partially twisted rope, and extruded sections.

13. A missile system, the system comprising:
    a missile chassis;
    at least one flexible mounting member secured to an inner surface of the missile chassis; and
    a miniature gas turbine engine secured to the missile chassis, the at least one flexible mounting member being located between an inner surface of the missile chassis and an aft portion of the miniature gas turbine engine, wherein the at least one flexible mounting member dampens vibrations between the miniature gas turbine engine and the missile chassis.

14. The system of claim 13, wherein the at least one flexible mounting member is at least one of the following: rope, high temperature rope, at least partially square-braided rope, at least partially knitted rope, at least partially twisted rope, and extruded sections.

15. The system of claim 13, wherein the inner surface of the missile chassis is an aft converging portion of the missile chassis that has a conical-frustum-shape.

16. The system of claim 13, wherein the at least one flexible mounting member comprises three segments of rope, wherein each of the three segments of rope are attached at the same longitudinal position of inner surface of the missile chassis and the three segments of rope are evenly distributed on the inner surface of the missile chassis.

17. The system of claim 13, wherein the at least one flexible mounting member is a single, continuous segment of rope.

18. The system of claim 13, wherein the at least one flexible mounting member is a single segment that forms a circle and when the miniature gas turbine engine is inserted into the missile chassis the miniature gas turbine engine is centered axially within the missile chassis by the at least one flexible member.

\* \* \* \* \*